US005169724A

United States Patent [19]

Fogarty

[11] Patent Number: 5,169,724

[45] Date of Patent: Dec. 8, 1992

[54] PROTECTIVELY COATED ELECTRICAL CONNECTOR PART

[75] Inventor: John F. Fogarty, Sidney, N.Y.

[73] Assignee: Amphenol Corporation, Wallingford, Conn.

[21] Appl. No.: 735,953

[22] Filed: Jul. 25, 1991

[51] Int. Cl.[5] .......................... B32B 15/08; B05D 1/00

[52] U.S. Cl. .................................... 428/457; 427/405; 427/409; 427/419.5; 428/469; 428/472.2

[58] Field of Search ............... 428/209, 216, 614, 457, 428/469, 472.2; 427/405, 409, 419.5

[56] References Cited

U.S. PATENT DOCUMENTS 3,620,839 11/1971 Geckle ................................ 117/226
3,776,762 12/1973 Bernath .............................. 117/93.1
4,099,899 7/1978 Dorsey, Jr. ......................... 148/6.27
4,268,568 5/1981 Sard et al. ........................... 428/209
4,355,124 10/1982 Baumann et al. ................... 524/104
4,684,192 8/1987 Long et al. .......................... 439/374
4,868,067 9/1989 Fujisawa et al. ..................... 428/614
4,894,279 1/1990 Sachdev et al. ..................... 428/216
4,944,889 7/1990 Awad ................................. 252/32.5

FOREIGN PATENT DOCUMENTS 1062820 12/1983 U.S.S.R. .

OTHER PUBLICATIONS

Uberbacher, IBM Technical Disclosure Bulletin "Split Function Contact", vol. 15, No. 2, Jul. 1972.

*Primary Examiner*—Thomas J. Herbert, Jr.
*Attorney, Agent, or Firm*—Bacon & Thomas

[57] ABSTRACT

A dry film lubricant is selectively applied to the plated, anodized, or conversion coated aluminum base material of an electrical connector part so as to maximize the corrosion protection on exposed surfaces while maintaining electrical conductivity on mating surfaces.

16 Claims, 3 Drawing Sheets

PROTECTIVELY COATED ELECTRICAL CONNECTOR PART

BACKGROUND OF THE INVENTION

1. Field of the Invention

This invention relates to a protectively coated metal part, and in particular to an electrical connector part having a long lasting protective coating selectively applied upon exposed surfaces to maximize corrosion protection while maintaining electrical conductivity on mated surfaces.

2. Description of Related Art

The most common light metal alloy currently used in electrical connectors is aluminum, finished by means of electroplating, electroless plating, anodizing, or conversion coating using existing commercially available technology to form conductive parts. Such conductive parts include shielding members and conductive shells for electrically shielding signal carrying contacts or components in the connector. Aluminum has a number of advantages in terms of weight, relative strength, manufacturability, cost, and conductivity when finished by the above-mentioned well-known techniques. Nevertheless, aluminum is subject to corrosion when exposed, which can severely limit the life of a connector subject to severe environmental conditions such as salt air, thus forcing the use of more expensive and difficult to handle alloy materials.

To overcome the problem of corrosion, and also to provide a non-conductive finish for user handled portions of a connector, it has previously been proposed to provide an overmolded plastic protective layer on the aluminum base material of a connector shell. Use of an overmolded protective layer can be effective against corrosion, but the initial investment required to implement the overmolding process, and the subsequent manufacturing costs, are relatively high in comparison with an all metal connector.

The present invention also offers a solution to the problem of corrosion, but at less cost and much greater ease of manufacture, by applying to a metal part a coating made of a chemically inert organic material, and in particular the type of material known as a "dry film lubricant," "solid film lubricant," or "lubricating paint." As the name implies, dry film lubricants have previously been used as lubricating coatings for metal parts because they adhere tenaciously to specific metals, and provide excellent friction reduction in cases where fluid lubricants cannot be used.

For example U.S. Pat. No. 4,684,192 discloses a protective coating made of a dry film lubricant made of graphite on an aluminum cam arm used for latching a connector part. Similarly, a number of publications, such as IBM Technical Disclosure Bulletin, Volume 15, No. 2; Soviet Patent publication No. 1062820; and U.S. Pat. Nos. 4,268,568, 4,355,124, and 3,620,839 all disclose dry film lubricants in the context of electrical switch contact lubrication.

However, in each of the above mentioned disclosures, the coatings are used on metal parts which contact other relatively moving metal parts, and not for protective purposes in situations where lubrication is not needed. In fact, it is very well-known to employ dry film lubricants as lubricants for purposes of friction reduction by applying the coatings to metal parts which contact and move relative to other metal parts. On the other hand, the advantages provided by using dry film lubricants as environmental sealants on parts which do not contact other parts has heretofore not been recognized. Use of dry film lubricants as corrosion protection coatings provides an entirely new class of connectors with all of the advantages of overmolded connectors and none of the disadvantages.

SUMMARY OF THE INVENTION

Accordingly, it is an objective of the invention to overcome the drawbacks of the prior art by providing a protective coating for a conductive metal part which does not require a high initial investment in molding equipment or complex manufacturing techniques.

It is a further objective of the invention to provide a connector part having a corrosion protection coating in the form of a protective paint applied to exposed surfaces, and which has good conductivity on portions requiring electrical contact with other metal parts.

It is yet another objective of the invention to provide a method of protectively coating a connector part by selectively applying a corrosion protection coating using a brush, spray, or immersion process to environmentally exposed surfaces of a metal part while maintaining good electrical conductivity on unexposed or mating surfaces.

These objectives are achieved by providing exposed surfaces of a conductive metal part, for example, a connector shell or connector coupling member, with a selectively applied protective coating in the form of a chemically inert dry film material such as a dry film lubricant, while at the same time leaving unexposed surfaces uncoated to ensure good electrical conductivity.

In a specific preferred embodiment of the invention, the objectives are achieved by applying the dry film lubricant to an aluminum base metal which has been finished by means of electroplating, electroless plating, anodizing, or conversion coating.

Thus, the preferred embodiment of the invention utilizes the chemical resistance of dry film lubricants and related materials to provide a new class of electrical connectors offering a unique combination of long-term corrosion resistance and ease of manufacture.

DETAILED DESCRIPTION OF THE PREFERRED EMBODIMENTS

Figure 1:
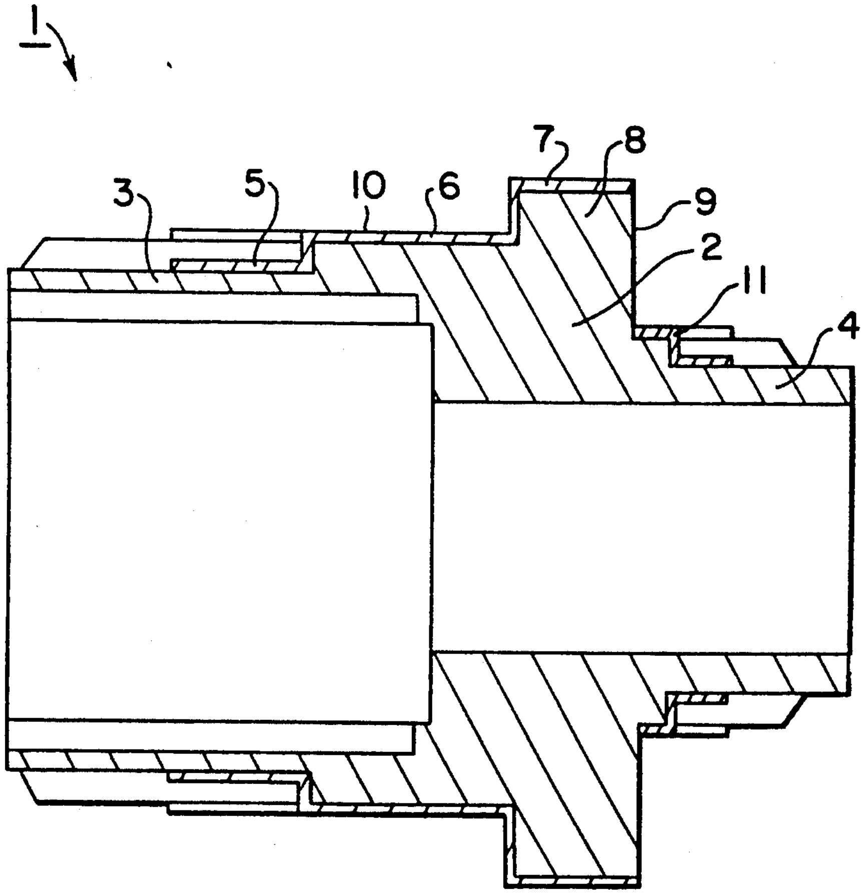
FIG. 1 is a cross-sectional view of a metal connector shell to which a protective coating has been selectively applied according to the principles of a preferred embodiment of the invention.

FIG. 1 shows a connector shell 1 including a main body 2 made of an aluminum base metal finished by means of electroplating, electroless plating, anodizing, or conversion coating using existing commercially available technology. It is to be understood, however, that the invention will find application in connection with connector part base metals other than aluminum, although aluminum is the most widely used base metal in connectors. It will of course be appreciated by those skilled in the art that the illustrated connector shells may have numerous shapes and configurations, the particular configuration shown being used for illustrative purposes only, and that the protective coating disclosed in detail below may be applied to any metal part, in addition to the illustrated electrical connector shell, which requires good conductivity and corrosion protection.

Connector shell 1 includes, by way of example, an externally threaded front coupling portion 3 and a rear coupling portion 4. A flange portion 8 is configured to be mounted on a panel of an electrically device and to make electrical contact therewith at surface 9 to provide a ground connection for the shell. When the connector is mounted and mated with a corresponding internally threaded coupling part, only surfaces 5, 6, 7, and 11 are exposed to the environment.

Figure 2:
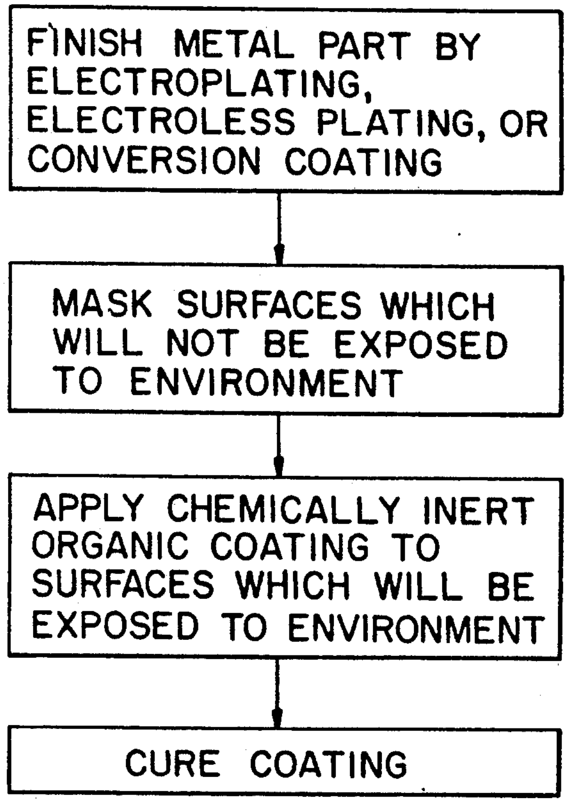
FIGS. 2 and 3 are flowcharts illustrating preferred methods of applying a protective coating to a metal part.

According to a first preferred embodiment of the invention, illustrated in FIG. 2, the base metal is finished by adding a conductive coating, such as a nickel coating, formed by electroplating or electroless plating, or by adding a conversion coating. The unexposed interior surfaces of the connector, the remaining unexposed portions 3 and 4, and surface 9 are left in a conductively finished state. The portions of the connector which will be exposed to the environment during use, after the connector has been mated, however, although also conductively finished, are additionally coated by a corrosion protective coating 10 in accordance with the principles of the invention.

As shown in FIG. 1, the thickness of coating 10 is exaggerated for illustrative purposes, the actual thickness of coating 10 being on the order of three to five ten-thousandths of an inch, with a thicker or thinner coating possible depending on the specific lubricant chosen.

Protective coating 10 is preferably made of a chemically inert non-conductive organic material. In an especially preferred embodiment, this material is a dry film or plastic lubricant, such as the dry film lubricant sold under the name EVERLUBE 620C, although it will be appreciated that a variety of dry film lubricants and other suitable non-conductive materials having similar corrosion resistance properties may be substituted for the EVERLUBE dry film lubricant, including various epoxy and polyamide resin materials having corrosion protection and base metal compatibility properties similar to those of the dry film lubricants.

By "dry film lubricant" is meant the class of materials formed by dispersing particles such as silicon, graphite, or polytetrafluorethylene in a binder matrix made, for example, of a polymeric resin. The lubricants must be wear resistant and non-reactive with the base metal. Both the binder and the solid lubrication and rheological materials are first blended in a liquid carrier for application and then, after application, the carrier is evaporated. As the resin cures, either by air drying or oven curing, it binds the solid lubricating particles to the surface of the part.

The preferred connector is manufactured using the following steps, illustrated in the flowchart of FIG. 2. Initially, the electrical connector component is finished by means of electroplating, electroless plating, or conversion coating using existing commercially available technology. The article is then coated with a dry film lubricant using a brush, spray, or immersion process. The coating is applied only to those areas of the connector that are exposed to the environment once all components are mated. If necessary, a maskant such as plastic, paper, or tape may be used to prevent the dry film lubricant from entering areas where electrical conductivity is required. Once the coating has been applied it is inspected for coating covering and any bear areas, pinholes, or other defects are repaired.

Once the article is selectively coated with dry film lubricant, any maskants are removed and the coating is heat cured. In the case of a coating such as EVERLUBE 620C, the coating is heat cured in a convection oven at 300° F. for two hours. Other similar coatings may be cured in different manners, for example by drying, as required. In this embodiment, processing of the connector part is complete after curing the protective coating.

Figure 3:
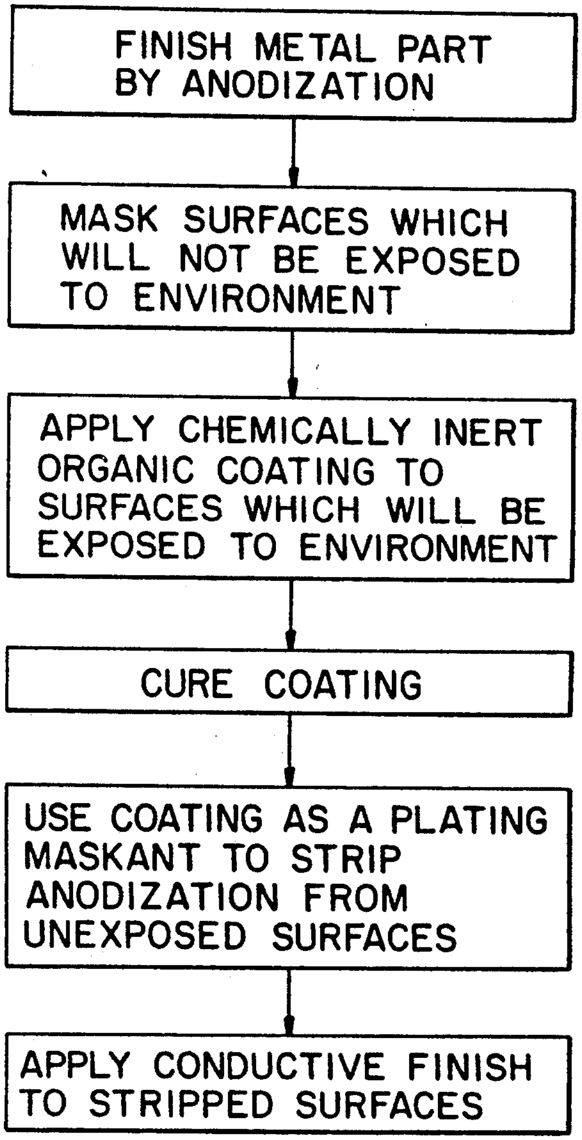

In a second preferred embodiment of the invention, shown in FIG. 3, the base metal is given a non-electrically conductive finish by anodization, and a dry film lubricant is applied as described above. This embodiment differs from the first embodiment in that, after application, the protective coating is further used as a plating maskant allowing the exposed anodization to be stripped, and the exposed aluminum alloy to be replated with a conductive nickel or similar metal finish.

The preferred embodiments described above are capable of producing an electrically shielded electrical connector that can survive 2,000 hours of salt spray, pass electrical requirements for use in jet aircraft, and survive a lightning strike. On the other hand, it will be appreciated by those skilled in the art that numerous variations of the embodiment described above may be made, including variations in the choice of base metals and the specific coatings used while still obtaining the above advantages. In fact, because of the ease of application of the protective coating, and its relative durability, the invention also possesses the advantage that it can easily accommodate numerous design changes, and also changes in materials. Consequently, however, it is all the more important to understand that the invention is not to be limited by the above description, but rather is to be limited solely by the appended claims.

I claim:

1. A conductive metal electrical connector part, comprising a coating material of particles dispersed in a polymeric resin selectively applied to a metal base material so as to maximize corrosion protection on surfaces of said part which are exposed to the environment and which do not contact other metal parts during use, while maintaining electrical conductivity on unexposed surfaces which contact other metal parts during use.

2. A system as claimed in claim 1, wherein said part is an electrical connector shell.

3. A system as claimed in claim 1, wherein said coating material is a dry film lubricant.

4. A system as claimed in claim 3, wherein said base material is a conversion coated aluminum base material.

5. A system as claimed in claim 3, wherein said base material is a plated aluminum base material.

6. A system as claimed in claim 3, wherein said base material is an anodized aluminum base material.

7. A system as claimed in claim 6, wherein said unexposed surfaces are conductively finished.

8. A method of corrosion protecting a metal electical connector part, comprising the steps of:

finishing a metal part by means of electroplating, electroless plating, anodizing, or conversion coating the part;

selectively applying a corrosion protective coating material of particles dispersed in a polymeric resin only to surfaces of said part that are exposed to the environment during use of said part and which do not contact other connector parts.

9. A method as claimed in claim 8, wherein said step of finishing a metal part comprises the step of finishing an electrical connector shell.

10. A method as claimed in claim 8, wherein said step of applying the coating comprises the step of applying a dry film lubricant.

11. A method as claimed in claim 8, wherein said step of applying the coating comprises the step of brushing, spraying, or immersing the metal part to apply the coating.

12. A method as claimed in claim 11, wherein said step of applying the coating comprises the step of applying a maskant to prevent the coating from entering areas where electrical conductivity is required.

13. A method of corrosion protecting a metal electrical connector part, comprising the steps of:

finishing the base metal by anodizing the base metal;

selectively applying a corrosion protective coating of particles dispersed in an organic resin only to areas of said part that are exposed to the environment during use of said part;

using said coating as a plating maskant while stripping the uncoated anodization; and replating the uncoated base metal with a conductive finish.

14. A method as claimed in claim 13, wherein said step of finishing a metal part comprises the step of finishing an electrical connector shell.

15. A method as claimed in claim 13, wherein said step of applying the coating comprises the step of applying a dry film lubricant.

16. A method as claimed in claim 15, wherein said step of applying the coating comprises the step of applying a maskant to prevent the coating from entering areas where electrical conductivity is required.

* * * * *